(12) United States Patent
Kakumoto et al.

(10) Patent No.: US 7,280,144 B2
(45) Date of Patent: Oct. 9, 2007

(54) SOLID-STATE IMAGE SENSING DEVICE WITH REDUCED LEAK CURRENT

(76) Inventors: Tomokazu Kakumoto, c/o Minolta Co., Ltd., Osaka Kokusai Bldg., 3-13, 2-Chome, Azuchi-Machi, Chou-Ku, Osaka-Shi, Osaka 541-8556 (JP); Masayuki Kusuda, c/o Minolta Co., Ltd., Osaka Kokusai Bldg., 3-13, 2-Chome, Azuchi-Machi, Chou-Ku, Osaka-Shi, Osaka 541-8556 (JP)

( * ) Notice: Subject to any disclaimer, the term of this patent is extended or adjusted under 35 U.S.C. 154(b) by 701 days.

(21) Appl. No.: 10/630,984

(22) Filed: Jul. 30, 2003

(65) Prior Publication Data

US 2004/0233304 A1    Nov. 25, 2004

(30) Foreign Application Priority Data

May 21, 2003    (JP) ............... 2003-142880

(51) Int. Cl.
*H04N 3/14* (2006.01)
(52) U.S. Cl. ................... 348/308; 348/301
(58) Field of Classification Search ........... 348/241, 348/243, 245, 296, 301, 308, 300
See application file for complete search history.

(56) References Cited

U.S. PATENT DOCUMENTS

| | | | |
|---|---|---|---|
| 6,812,448 B2* | 11/2004 | Kakumoto | 250/208.1 |
| 6,836,291 B1* | 12/2004 | Nakamura et al. | 348/301 |
| 6,847,400 B2* | 1/2005 | Hosier et al. | 348/313 |
| 6,882,367 B1* | 4/2005 | Merrill et al. | 348/308 |
| 7,012,645 B1* | 3/2006 | Tsai | 348/308 |
| 7,030,921 B2* | 4/2006 | Hagihara et al. | 348/308 |
| 7,064,313 B1* | 6/2006 | Mann et al. | 250/214.1 |
| 2002/0054389 A1 | 5/2002 | Takada et al. | 358/513 |
| 2004/0080646 A1* | 4/2004 | Zhao et al. | 348/302 |
| 2005/0083422 A1* | 4/2005 | Lee et al. | 348/308 |

FOREIGN PATENT DOCUMENTS

| | | | |
|---|---|---|---|
| EP | 1178674 A1 | * | 2/2002 |
| EP | 1187217 A2 | * | 3/2002 |
| JP | 11313257 A | * | 11/1999 |

* cited by examiner

*Primary Examiner*—Vivek Srivastava
*Assistant Examiner*—Timothy J Henn
(74) *Attorney, Agent, or Firm*—Sidley Austin LLP

(57) ABSTRACT

Disclosed is a solid-state image sensing device having at least one pixel. The pixel comprises a photoelectric conversion section for outputting an electric signal according to a quantity of incident light, and a sample hold circuit for sampling and holding the electric signal from the photoelectric conversion section and outputting the sampled and held electric signal as an image signal. In this device, a reset voltage for resetting the sample hold circuit obtains at least two different values.

21 Claims, 13 Drawing Sheets

SOLID-STATE IMAGE SENSING DEVICE WITH REDUCED LEAK CURRENT

CROSS-REFERENCE TO RELATED APPLICATION(S)

This application is based on Japanese Patent Application No. 2003-142880 filed with Japan Patent Office on May 21, 2003, the entire content of which is hereby incorporated by reference.

BACKGROUND OF THE INVENTION

1. Field of the Invention

The present invention relates to a solid-state image sensing device which is capable of imaging all pixels at the same timing. Particularly, the invention relatives to the solid-state image sensing device having an electronic shutter function.

2. Description of the Related Art

Solid-state image sensing devices which are conventionally used are roughly classified into CCD type and MOS type according to units which read photocharges generated at a photoelectric conversion element. CCD type devices accumulate photocharges in a potential well and simultaneously transmit them. MOS type devices read electric charges accumulated in a pn joint capacity of a photodiode through an MOS transistor.

In the MOS type solid-state image sensing devices, after each pixel is imaged by vertical scanning and horizontal scanning, image signals output from the pixels, respectively, are output serially from the solid-state image sensing devices. The timing, therefore, at which each pixel is imaged differs from each other. When a subject which changes momently is imaged, the imaging cannot be carried out on each pixel under the same condition, and in result image distortion occasionally occurs.

As prior solid-state image sensing devices, therefore, a device, in which two integrating circuits are provided and the imaging operation is performed on all the pixels at the same timing, is suggested (see U.S. Publication of Patent Application No. 2002/0054389). A structure of the pixels in the prior solid-state image sensing device is shown in FIG. 22. The pixel in FIG. 22 has a photoelectric conversion circuit 100, a capacitor C1, a capacitor C2, an MOS transistor T4, an MOS transistor T5, an MOS transistor T6, and an MOS transistor T3. The photoelectric conversion circuit 100 generates an electric signal according to incident light, and the capacitor C1 integrates the electric signal. The capacitor C2 samples and holds the electric signal integrated by the capacitor C1, and the MOS transistor T4 amplifies a current of the electric signal sampled and held by the capacitor C2. The MOS transistor T5 electrically connects and disconnects the capacitors C1 and C2, and the MOS transistor T6 serves as a switch for resetting the capacitor C2. The MOS transistor T3 serves as a switch for outputting the electric signal from the MOS transistor T4 as an image signal.

In the solid-state image sensing device having the pixels of the structure in FIG. 22, the photoelectric conversion circuits 100 and the MOS transistors T5 on all the pixels operate at the same timing, and after the electric signals obtained by performing the imaging operation at the same time are integrated by the capacitors C1, they are sampled and held by the capacitors C2. After the MOS transistors T5 are turned off, the pixels are scanned in the horizontal and vertical directions, and image signals according to the electric signals sampled and held by the capacitors C2 are amplified and output from the pixels.

In the solid-state image sensing device having the structure in FIG. 22, a DC voltage VRS which does not change is always applied to a source of the MOS transistor T6. For this reason, even if the MOS transistor T6 is OFF, a leak current flows in a voltage supply line for supplying the DC voltage VRS from the capacitor C2 via the source-drain of the MOS transistor T6. The leak current from the capacitor C2 increases as ambient temperature of the solid-state image sensing device becomes higher. The leak current is determined by a potential difference between the source and the drain of the MOS transistor T6 and ON resistance of the MOS transistor T6.

Even if, therefore, the electronic shutter function, which resets the photoelectric conversion circuits 100 and turns the MOS transistors T5 ON on all the pixels of the solid-state image sensing device at the same timing, is used, after the electric signals are sampled and held by the capacitors C2, they are read sequentially on the respective pixels. A quantity of the leak current from the capacitors C2 on the pixels differ according to reading time. Since the leak current from the capacitors C2 on the pixels differs, in result when image data obtained from the solid-state image sensing device are reproduced, shading noise which becomes image distortion occurs. Since a quantity of the leak current changes due to a change in the ambient temperature, a strength of the image signals to be output is influenced by the ambient temperature.

SUMMARY OF THE INVENTION

In view of these problems, it is an object of the present invention to provide a solid-state image sensing device which is capable of imaging all pixels at same timing and suppressing leak current on the pixels.

In order to achieve the above object, a solid-state image sensing device from one aspect of the present invention includes one or plural pixels(s) having a photoelectric conversion section for outputting an electric signal according to a quantity of incident light and a sample hold circuit for sampling and holding the electric signal from the photoelectric conversion section and outputting the sampled and held electric signal as an image signal. In the device, a reset voltage for resetting the sample hold circuit obtains at least two different values.

According to the solid-state image sensing device with this structure, the electric signal is the voltage signal, and when the electric signal is sampled and held by the sample hold circuit, the reset voltage is set to a value which is different from the value of the voltage for resetting the sample hold circuit. As a result, a leak current from the sample hold circuit is reduced or suppressed.

In the solid-state image sensing device with the above structure, the pixels may have a switch for electrically connecting and disconnecting the photoelectric conversion section and the sample hold circuit. At this time, when a plurality of the pixels are provided, the photoelectric conversion sections and the switches operate at the same timing with respect to all the pixels, and the electric signals obtained by the imaging at the same timing are sampled and held by the sample hold circuits on the pixels, respectively. After the sample hold circuits are rest, the switches are turned on, so that the electric signals from the photoelectric conversion sections are given to the sample hold circuits.

In the solid-state image sensing device having the above structure, the reset voltage may be a first voltage during pixel reset time where the pixels are reset, and the reset voltage may be a second voltage during time other than the pixel reset time. The pixel reset time includes starting time of the reset of the sample hold circuits through time before output of the image signals from the sample hold circuits.

In the solid-state image sensing device having the above structure, the reset voltage may be a first voltage during the sample hold circuit reset time where the sample hold circuits are reset, and the reset voltage may be a second voltage during time other than the sample hold circuit reset time.

In the solid-state image sensing device having the above structure, the photoelectric conversion section includes a photoelectric conversion circuit for generating electric charge according to a quantity of incident light, and an integrating circuit for outputting a voltage obtained by accumulating the electric charge from the photoelectric conversion circuit as the electric signal. At this time, the integrating circuit may have a capacitor for accumulating the electric charge output from the photoelectric conversion circuit.

In the solid-state image sensing device in which the photoelectric conversion section includes the photoelectric conversion circuit and the integrating circuit, the reset voltage to be applied to the sample hold circuit may be applied to the integrating circuit. At this time, in the case where the former one of the examples where the reset voltage is changed is adopted, the integrating circuit is reset during the pixel reset time. In the case where the latter one of the examples where the reset voltage is changed is adopted, the reset voltage is a first voltage also during rest time where the integrating circuit is reset.

In the solid-state image sensing device in which the photoelectric conversion section includes the photoelectric conversion circuit and the integrating circuit, a DC reset voltage with a constant value which is different from the reset voltage to be given to the sample hold circuit may be applied to the integrating circuit.

According to the solid-state image sensing device in which the photoelectric conversion section includes the photoelectric conversion circuit and the integrating circuit, the electric charge output from the photoelectric conversion circuit is accumulated at the integrating circuit, so that a voltage according to an integrated value of the quantity of incident light can be obtained at the integrating circuit. Thereafter, the voltage obtained at the integrating circuit is output as the electric signal to the sample hold circuit and is sampled and held, and the voltage according to the integrated value of the quantity of the incident light is output as the image signal.

The sample hold circuit may have a capacitor for sampling and holding the electric signal. The sample hold circuit includes a transistor which has a first electrode, a second electrode and a control electrode and inputs a voltage from the first integrating circuit into the control electrode, and a capacitor whose one end is connected with a second electrode of the transistor. A voltage which appears at a connecting node between the second electrode of the transistor and the capacitor serves as the image signal. In the solid-state image sensing device, the sample hold circuit may include an output switch for electrically connecting and disconnecting output signal line for outputting the electric signal as the image signal and the capacitor.

In the solid-state image sensing device, the photoelectric conversion section may output an electric signal which is linearly converted with respect to the quantity of the incident light, or the photoelectric conversion section may output an electric signal which is converted logarithmically with respect to the quantity of the incident light.

The solid-state image sensing device, in which the photoelectric conversion section includes the photoelectric conversion circuit and the integrating circuit, may include a first reset switch, a second reset switch and a third reset switch. The first reset switch is connected with one end of a first capacitor in the integrating circuit and resets the first capacitor. The second reset switch is connected with the control electrode of the transistor in the sample hole circuit. The third reset switch is connected with one end of a second capacitor in the sample hold circuit and resets the second capacitor. In the solid-state image sensing device, a second reset switch which is connected with the control electrode of the transistor, and the third reset switch which is connected with one end of the second capacitor and resets the second capacitor may be provided, so that the first capacitor and the control electrode of the transistor may be reset simultaneously by turning on the switch and the second reset switch.

The solid-state image sensing device may include an output circuit for amplifying the voltage output from the sample hold circuit and outputting the image signal. The photoelectric conversion circuit may output the electric signal which changes in a naturally logarithmic manner with respect to the quantity of the incident light. The photoelectric conversion circuit may be switched between a linear transforming operation for outputting the electric signal which changes linearly with respect to the quantity of the incident light and a logarithmic transforming operation for outputting the electric signal which changes in the naturally logarithmic manner with respect to the quantity of the incident light. At this time, the photoelectric conversion circuit performs the linear transforming operation until the quantity of the incident light reaches a predetermined value, and when the quantity exceeds the predetermined value, the operation is changed into the logarithmic transforming operation.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

Embodiments of the present invention will be explained below with reference to the drawings.

<Outline of a Structure of the Solid-State Image Sensing Device>

Figure 1:
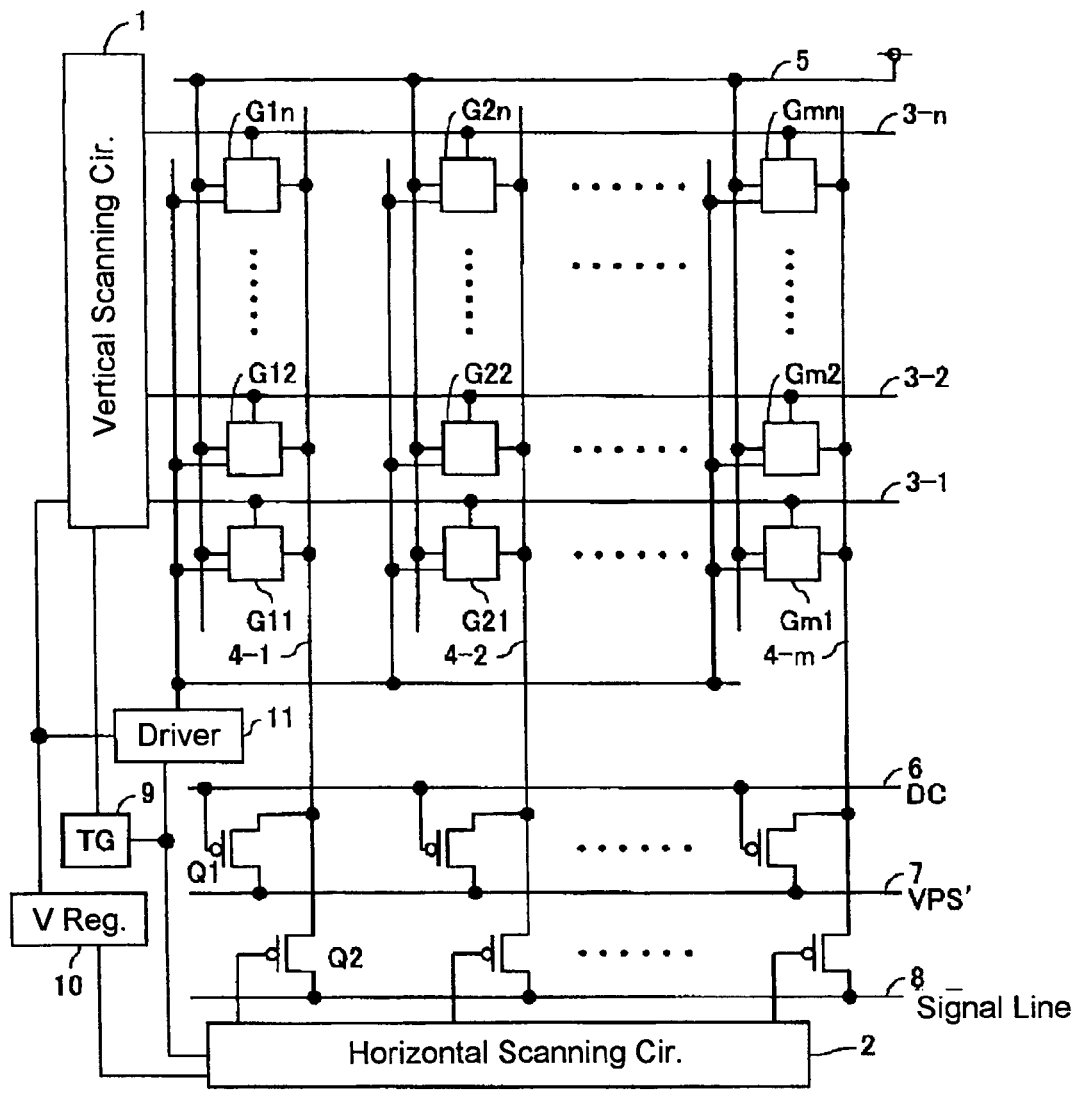
FIG. 1 is a block circuit diagram that shows a structure of a solid-state image sensing device.

The structure of the solid-state image sensing device which is common in respective embodiments will be explained with reference to FIG. 1. FIG. 1 is a block diagram that shows the structure of the solid-state image sensing device.

In FIG. 1, G11 to Gmn designate pixels which are arranged in a matrix pattern. A vertical scanning circuit 1 is provided to sequentially scan lines 3-1, 3-2, 3-n for giving a signal φV to the pixels. Also provided is a horizontal scanning circuit 2 which sequentially reads photoelectric conversion signals, which led from the pixels to output signal lines 4-1, 4-2, . . . , 4-m, in a horizontal direction on the respective pixels. 5 designates a power source line. The pixels are connected with not only the lines 3-1 to 3-n, the output signal lines 4-1 to 4-m, and the power source line 5 but also another lines (for example, a clock line, a bias supply line, and the like), but they are omitted in FIG. 1.

A pair of p-channel MOS transistors Q1 and Q2 are provided on each of the output signal lines 4-1, 4-2, . . . , to 4-m as shown in FIG. 1. The output signal line 4-1 is explained as an example. A gate of the MOS transistor Q1 is connected with a DC voltage line 6, a drain is connected with the output signal line 4-1, and a source is connected with a line 7 of DC voltage VPS'. Meanwhile, a drain of the MOS transistor Q2 is connected with the output signal line 4-1, a source is connected with a final signal line 8, and a gate is connected with the horizontal scanning circuit 2.

Figure 2:
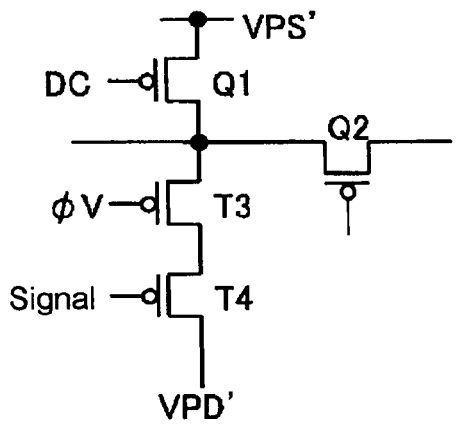
FIG. 2 is a diagram that shows a part of FIG. 1.

The pixels G11 to Gmn have a p-channel MOS transistor T4 which outputs a signal based on photocharges generated on each pixel, and a p-channel MOS transistor T3 which serves as a switch for electrically connecting and disconnecting each pixel with each of the output signal lines 4-1 to 4-m as mentioned later. A relationship between the MOS transistors T3, T4, Q1, and Q2 is shown in FIG. 2. Since a DC voltage DC is always applied to the gate of the MOS transistor Q1, the MOS transistor Q1 is equivalent to resistance or constant current source. The MOS transistors T4 and Q1, therefore, compose a source follower amplifying circuit. In this case, it may be considered that the MOS transistor T4 amplifies and outputs an electric current. The MOS transistor T3 operates as a switch for selecting a line, and the MOS transistor Q2 operates as a switch for selecting a row.

With such a structure, a large signal can be output. In the case where the pixels convert photocurrent which is generated from a photosensitive element in a natural logarithmic manner in order to enlarge a dynamic range, the output signal is small in its original state, but since the signal is amplified by the amplifying circuit into a sufficiently large signal, a process in a following signal processing circuit (not shown) becomes easy. The MOS transistor Q1 which composes a load resistance portion in the amplifying circuit is not provided in the pixels but provided on each of the output signal lines 4-1 to 4-m which are connected with the pixels arranged in a row direction. As a result, a number of the load resistances or the constant current sources can be reduced, and thus an area of a semiconductor chip occupied by the amplifying circuit can be reduced.

The vertical scanning circuit 1 and the horizontal scanning circuit 2 are connected with a timing generator 9 and a voltage regulator 10, so that the vertical and horizontal scanning is realized. More specifically, a clock signal is input from the timing generator 9 to the vertical scanning circuit 1 and the horizontal scanning circuit 2. Various voltages which are supplied from the voltage regulator 10 are applied to the pixels G11 to Gmn at determined timing by drivers in the scanning circuits based on the clock signals. As a result, the vertical and horizontal scanning is realized.

The solid-state image sensing device has an electronic shutter function and thus controls all the pixels simultaneously during vertical blank time. In order to make this simultaneous control, a driver 11 is provided separately from the vertical scanning circuit 1 and the horizontal scanning circuit 2. The driver 11 is connected with all the pixels G11 to Gmn. A clock signal is input from the timing generator 9 also to the driver 11, and the various voltages supplied from the voltage regulator 10 can be applied to all the pixels G11 to Gmn simultaneously at determined timing.

First Embodiment

Figure 3:
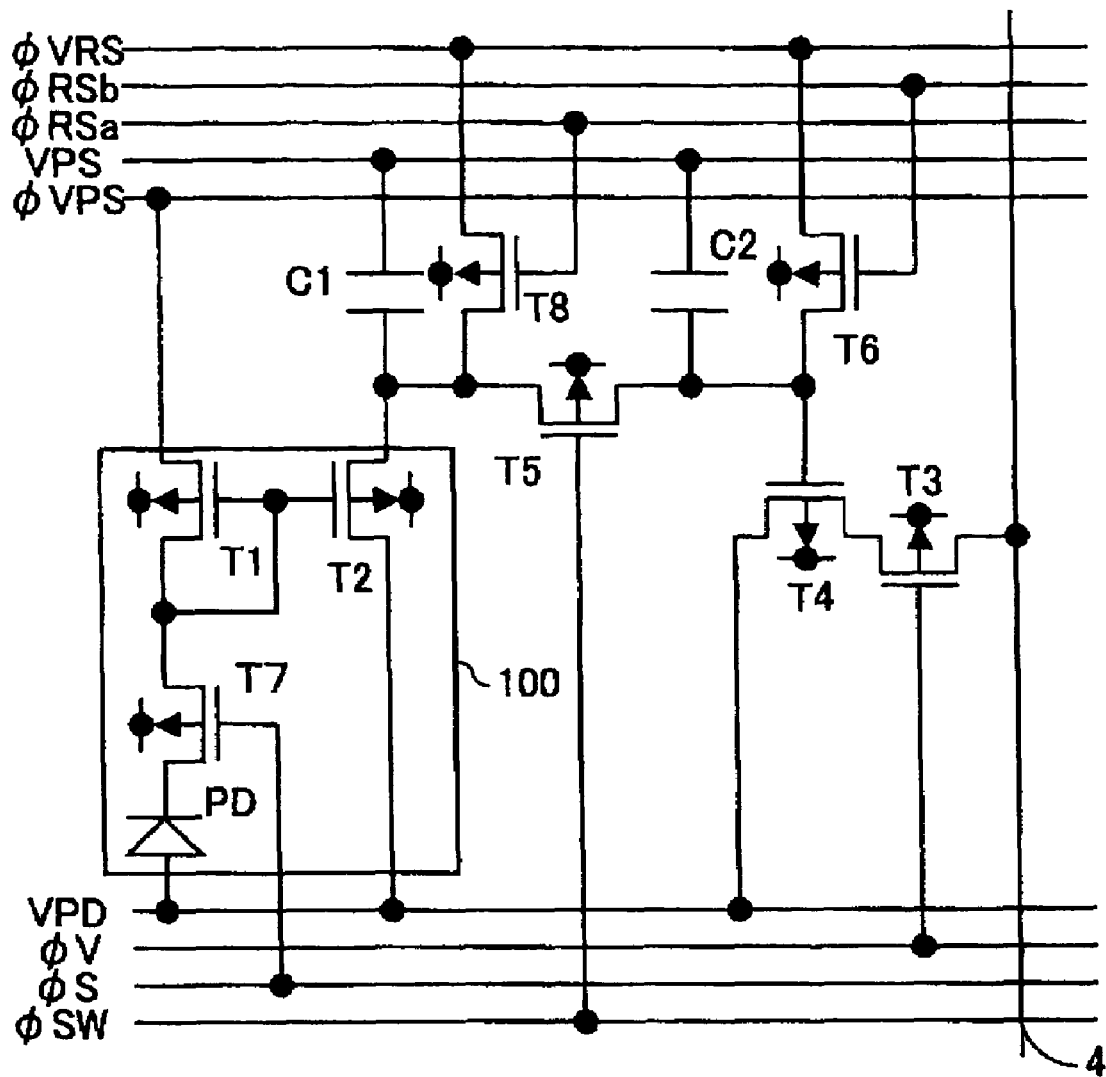
FIG. 3 is a circuit diagram that shows a structure of a pixel in the solid-state image sensing device according to a first embodiment.

The first embodiment which is applied to the pixels with the structure shown in FIG. 1 is explained with reference to the drawings. FIG. 3 is a circuit diagram that shows a structure of the pixel provided in the solid-state image sensing device used in the first embodiment. In the circuit of FIG. 3, a voltage signal φV is supplied from the driver in the vertical scanning circuit 1, and voltage signals other than the signal φV are supplied from the driver 11.

In FIG. 3, a pn photodiode PD serves as the photosensitive element. An anode of the photodiode PD is connected with a drain of the MOS transistor T7, and a source of the MOS transistor T7 is connected with a gate and a drain of an MOS transistor T1, and a gate of an MOS transistor T2. ADC voltage VPS is applied to one end of a capacitor C1, and a source of the MOS transistor T2 is connected with the other end of the capacitor C1. A connecting node between the capacitor C1 and the source of the MOS transistor T2 is connected with a drain of an MOS transistor T5 and a drain of an MOS transistor T8.

The DC voltage VPS is applied to one end of a capacitor C2, and a source of the MOS transistor T5 is connected with the other end of the capacitor C2, a gate of the MOS transistor T4, and a drain of an MOS transistor T6. A source of the MOS transistor T4 is connected with a drain of the MOS transistor T3, and a source of the MOS transistor T3 is connected with the output signal line 4 (the output signal line 4 corresponds to 4-1, 4-2, . . . , 4-$m$ in FIG. 1). The MOS transistors T1 to T8 are p-channel MOS transistors.

A DC voltage VPD is applied to a cathode of the photodiode PD, and drains of the MOS transistors T2 and T4. A signal $\phi$VRS is given to sources of the MOS transistors T6 and T8. Meanwhile, a signal $\phi$VPS is input into a source of the MOS transistor T1. Signals $\phi$V, $\phi$SW, $\phi$S, $\phi$RSa and $\phi$RSb are input into gates of the MOS transistors T3, T5, T7, T8, and T6, respectively. At this time, the MOS transistors T1, T2, T7, and the photodiode PD compose the photoelectric conversion circuit 100.

The signal $\phi$VPS is a binary voltage signal. In this signal, a voltage, which operates the MOS transistor T1 in a subthreshold area when a quantity of incident light exceeds a predetermined value, is VL, and a voltage, which is higher than the voltage VL and brings the MOS transistor T1 into a conductive state, is VH. The signal $\phi$VRS is a binary voltage signal. In this signal, a voltage, which resets the capacitors C1 and C2, is Vh which is close to the DC voltage VPS, and an intermediate potential between the DC voltages VPS and VPD, is Vl. The intermediate potential Vl may be an intermediate value between a potential of the capacitor C2 when an image signal becomes a black level (minimum value) and a potential of the capacitor C2 when the image signal becomes a white level (maximum value).

1. First Example of Operation of the Pixel

Figure 4:
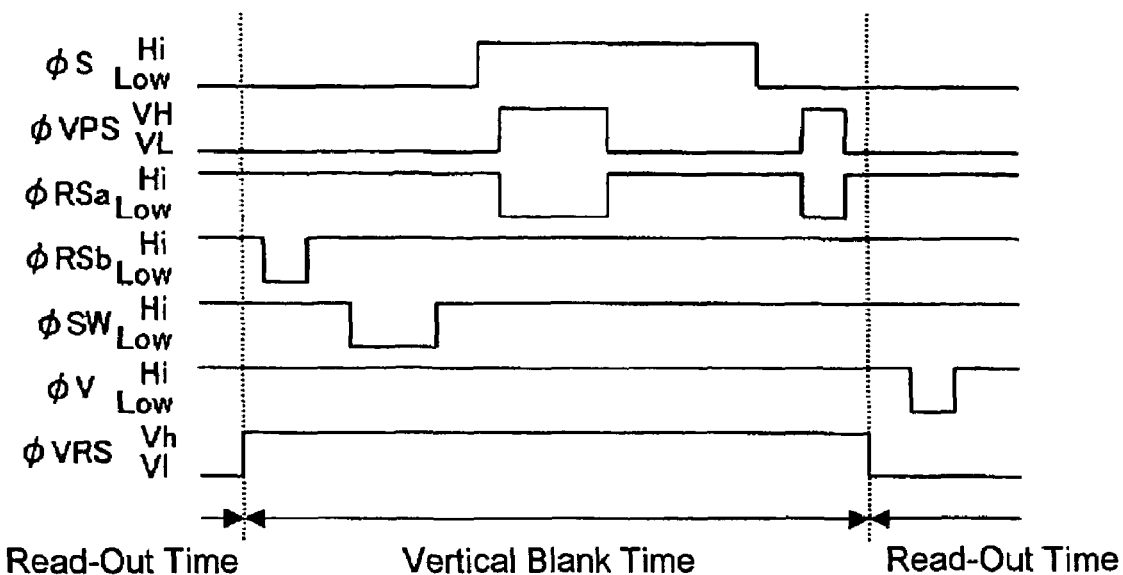
FIG. 4 is a timing chart that shows a first example of an operation of the pixel in FIG. 3.

The first example of the operation of the pixel with the structure shown in FIG. 3 will be explained below with reference to a timing chart of FIG. 4. When a signal $\phi$S is low, the MOS transistor T7 is turned on and the signal $\phi$VPS is VL, photocharges according to a quantity of incident light flow from the photodiode PD into the MOS transistor T1. A voltage according to the quantity of the incident light appears at the gates of the MOS transistors T1 and t2, and electric current according to the quantity of the incident light flows in the MOS transistor T2. Negative charges flow into the capacitor C1 via the MOS transistor T2, so that an integrating operation is performed. At this time, a value of the signal $\phi$VRS is Vl.

When brightness of a subject is low at this time, the photocharges are accumulated at the gate of the MOS transistor T1 because the MOS transistor T1 is in a cut-off state, and a voltage which is linearly proportional to the quantity of the incident light appears at the gates of the MOS transistors T1 and T2. A voltage which appears at the connecting node between the capacitor C1 and the MOS transistor T2 obtains a value which is linearly proportional to an integrated value of the quantity of the incident light.

When the brightness of the subject is high and the voltage according to the quantity of the photocharges accumulated at the gate of the MOS transistor T1 becomes low, a voltage which is proportional to the quantity of the incident light in a naturally logarithmic manner appears at the gate of the MOS transistor T1 because the MOS transistor T1 operates in a subthreshold area. The voltage which appears at the connecting node between the capacitor C1 and the MOS transistor T2 obtains a value which is proportional to the integrated value of the quantity of the incident light in a naturally logarithmic manner.

A value of the signal $\phi$VRS is Vh, the voltages which are applied to the MOS transistors T6 and T8 are set to be high, so that the capacitors C1 and C2 are brought into a reset-possible state by the MOS transistors T6 and T8. The signal $\phi$RSb is low and the MOS transistor T6 is turned ON, so that a voltage at a connecting node between the gate of the MOS transistor T4 and the capacitor C2 is reset. After the low pulse signal $\phi$RSb is given, a low pulse signal $\phi$SW is given.

When the signal $\phi$SW is low, the MOS transistor T5 is turned ON, and a voltage which appears at the connecting node between the source of the MOS transistor T2 and the capacitor C1 is sampled and held by the capacitor C2. After the signal $\phi$SW is set to be high, the signal $\phi$S is set to be high and the MOS transistor T7 is turned off, so that the photodiode PD is electrically disconnected with the MOS transistors T1 and T2. At this time, positive charges flow into the source of the MOS transistor T1, so that negative charge, which are accumulated at the gate and the drain of the MOS transistor T1 and the gate of the MOS transistor T2, are recombined, and potential at the gate and the drain of the MOS transistor T1 rises to a certain extent.

When the signal $\phi$VPS is VH and the source voltage at the MOS transistor T1 is heightened, a quantity of positive charges flowing into the source of the MOS transistor T1 increases, and negative charges accumulated at the gate and the drain of the MOS transistor T1 and the gate of the MOS transistor T2 are quickly recombined. At this time, the signal $\phi$RSa is low and the MOS transistor T8 is turned ON, so that the voltage at the connecting node between the capacitor C1 and the gate of the MOS transistor T2 is initialized.

The signal $\phi$VPS is VL, the potential of the MOS transistor T1 is initialized, and the signal $\phi$RSa is set to be high so that the MOS transistor T8 is turned off. Thereafter, the signal $\phi$S is low and the MOS transistor T7 is turned on, so that the MOS transistors T1 and T2, and the photodiode PD are electrically connected. The signal $\phi$VPS is again set to VH, so that negative charges remaining on the photodiode PD are recombined, and after the potentials at the photodiode PD and the MOS transistors T1 and T2 are initialized, the signal $\phi$VPS is set to VL. At the same time, the low pulse signal $\phi$RSa is given to the gate of the MOS transistor T8 so that the capacitor C1 is initialized. When the resetting of the pixels is ended, the value of the signal $\phi$VRS is set to Vl so that the voltages applied to the sources of the MOS transistors T6 and T8 are lowered, and a voltage difference between the source and the drain of the MOS transistors T6 and T8 is lowered.

The signals $\phi$S, $\phi$SW, $\phi$VPS, $\phi$RSa, $\phi$RSb and $\phi$VRS operate all the pixels G11 to Gmn composing the solid-state image sensing device simultaneously at the vertical blank time. The electric signals which are obtained by imaging at the same timing, therefore, can be accumulated at the capacitor C2 as the image signals. Namely, a voltage, which is proportional to the integrated value of the quantity of the incident light in a linear or naturally logarithmic manner, appears at a connecting node between the capacitor C2 and the gate of the MOS transistor T4.

When the low pulse signal $\phi$V is given to each line and the MOS transistor T3 is turned on, an electric current, which is in accordance with the voltage based on the value obtained by integrating the quantity of the incident light at the capacitor C2, flows in the MOS transistor T4, so that the image signal which has a voltage value according to the integrated value of the quantity of the incident light appears at the signal line 4. At this time, the signal φVRS has a value of Vl, and since a voltage difference between the source and the drain of the MOS transistors T6 and T8 is low, leak currents generated from the capacitors C2 and C1 via the MOS transistors T6 and T8 can be suppressed.

After the image signals are output from all the pixels G11 to Gmn at each line, the signals φS, φSW, φVPS, φRSa, φRSb and φVRS operate all the pixels G11 to Gmn at the same timing similarly to the above operation. In this operational example, the signal φVRS maintains the value Vh during the time which is approximately equal with the vertical blank time.

2. Second Example of the Operation of the Pixel

Figure 5:
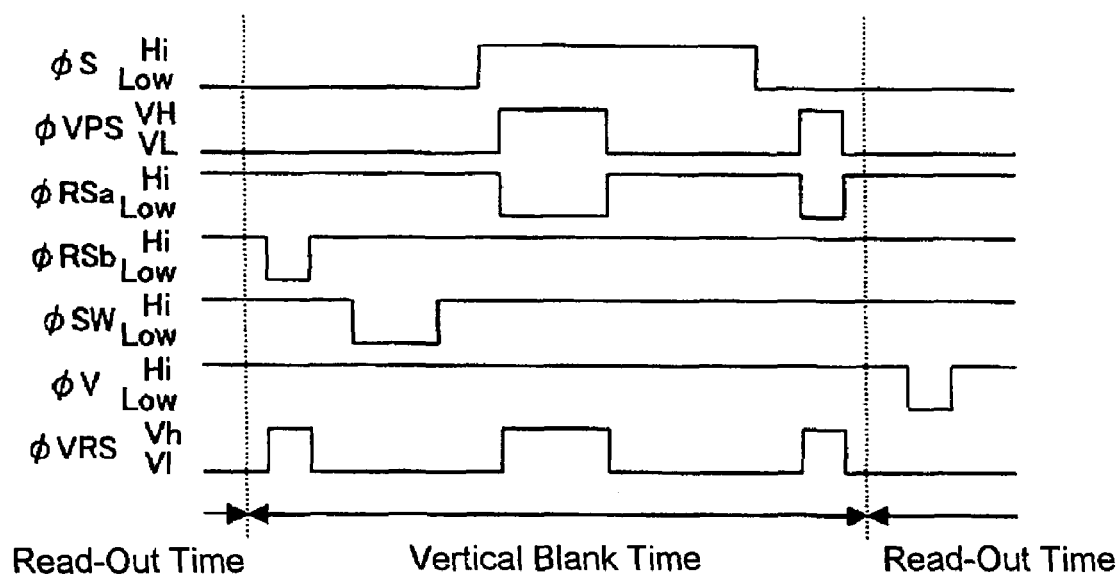
FIG. 5 is a timing chart that shows a second example of the operation of the pixel in FIG. 3.

The second example of the operation of the pixel with the structure in FIG. 3 will be explained below with reference to a timing chart of FIG. 5. In this operational example, detailed explanation of the operation which is the same as that in the first example in the timing chart of FIG. 4 is omitted. Similarly to the first example, when the signal φS is low, the MOS transistor T7 is turned on and the signal φVPS is set to VL, the photocharges according to the quantity of the incident light flow from the photodiode PD into the MOS transistor T1, and the integrating operation is performed at the capacitor C1. At this time, the value of the signal φVRS is set to Vl, so that the voltage difference between the source and the drain of the MOS transistors T6 and T8 is lowered.

The signal φVRS is set to Vh, the signal φRSb is low, the MOS transistor T6 is turned on, and the source voltage at the MOS transistor T6 is heightened, so that the voltage at the connecting node between the gate of the MOS transistor T4 and the capacitor C2 is reset by the MOS transistor T6. The signal φVRS is set to Vl and the signal φRSb is set to be high, so that the MOS transistor T6 is turned off, and the voltage difference between the source and the drain of the MOS transistors T6 and T8 is again lowered.

Similarly to the first example, the low pulse signal φSW is given to the MOS transistor T5, and after the voltage which appears at the capacitor C1 is sampled and held at the capacitor C2, the signal φS is set to be high, and the MOS transistors T1 and T2 are started to be reset. At this time, the signal φVPS is temporarily set to VH, so that the negative charges accumulated at the gates of the MOS transistors T1 and T2 are recombined quickly. When the signal φVPS is temporarily set to VH, the value of the signal φVRS is set to Vh and the signal φRSa is set to be low so that the MOS transistor T8 is turned on and the source voltage at the MOS transistor T8 is heightened. As a result, the capacitor C1 is reset. The signal φS is set to be low, so that the photodiode PD and the MOS transistors T1 and T2 are electrically connected with each other via the MOS transistor T7.

When the signal φVPS is temporarily set to VH again, the negative charges remaining on the photodiode PD are recombined, and after the potentials at the photodiode PD and the MOS transistors T1 and T2 are initialized, the signal φVPS is set to VL. At this time, simultaneously the signal φVRS is set to Vh and the signal φRSa is set to be low, so that the MOS transistor T8 is turned on and the source voltage at the transistor T8 is heightened. As a result, the capacitor C1 is reset. The signal φRSa, thereafter, is set to be high, and the MOS transistor T8 is turned off, and the signal φVPS is set to be low. The signal φVRS is set to Vl, so that the voltage difference between the source and the drain of the MOS transistors T6 and T8 is lowered.

The signals φS, φSW, φVPS, φRSa, φRSb and φVRS, similarly to the first example, operate all the pixels G11 to Gmn composing the solid-state image sensing device simultaneously for the vertical blank time. Similarly to the first example, thereafter, the low pulse signal φV is given to each line and the MOS transistor T3 is turned on, so that the image signals are output from all the pixels G11 to Gmn. In second operational example, only when the capacitors C1 and C2 are reset, the signal φVRS is set to Vh. For this reason, the leak current can be reduced even at the vertical blank time in comparison with the first example.

3. Another Structure of the Pixel

Figure 6:
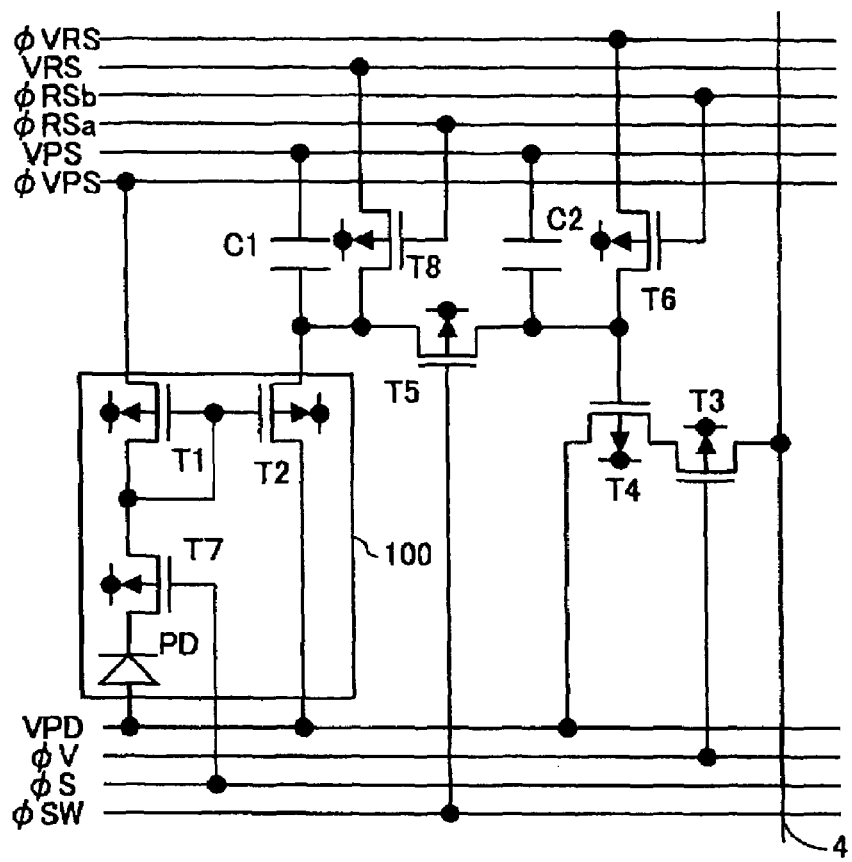
FIG. 6 is a circuit diagram that shows another structure of the pixel in the solid-state image sensing device according to the first embodiment.
Figure 7:
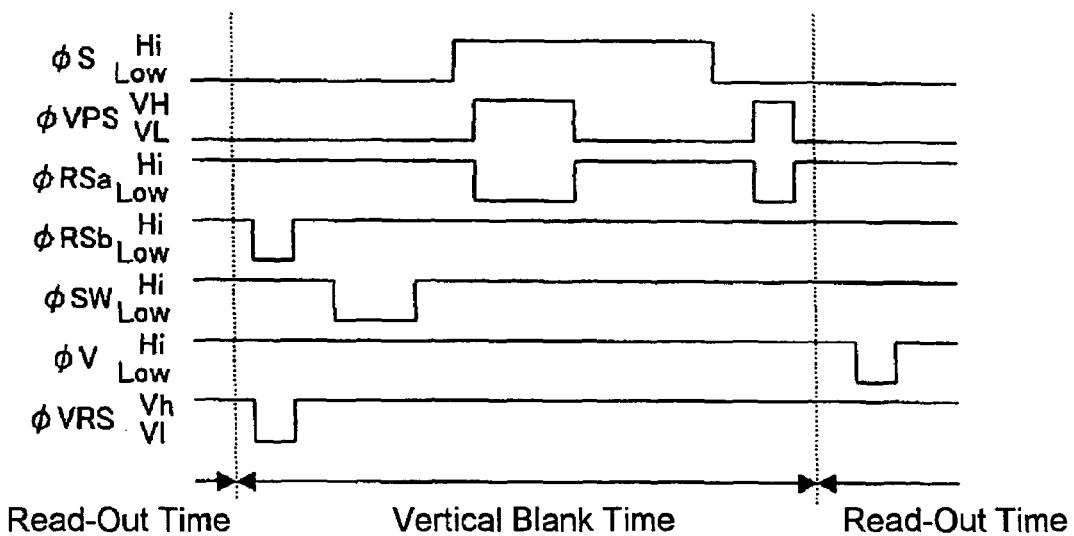
FIG. 7 is a timing chart that shows the operation of the pixel in FIG. 6.

The structure of the pixel in the first embodiment may be such that, as shown in FIG. 6, the DC voltage VRS is applied to the source of the MOS transistor T8. With such a structure, since the DC voltage VRS which always has the value Vh is applied to the source of the MOS transistor T8, the capacitor C1 can be reset regardless of the value of the signal φVRS. As shown in FIG. 7, therefore, when only the low pulse signal φRSb is given and the capacitor C2 is reset, the signal φVRS may be set to Vh.

Second Embodiment

Figure 8:
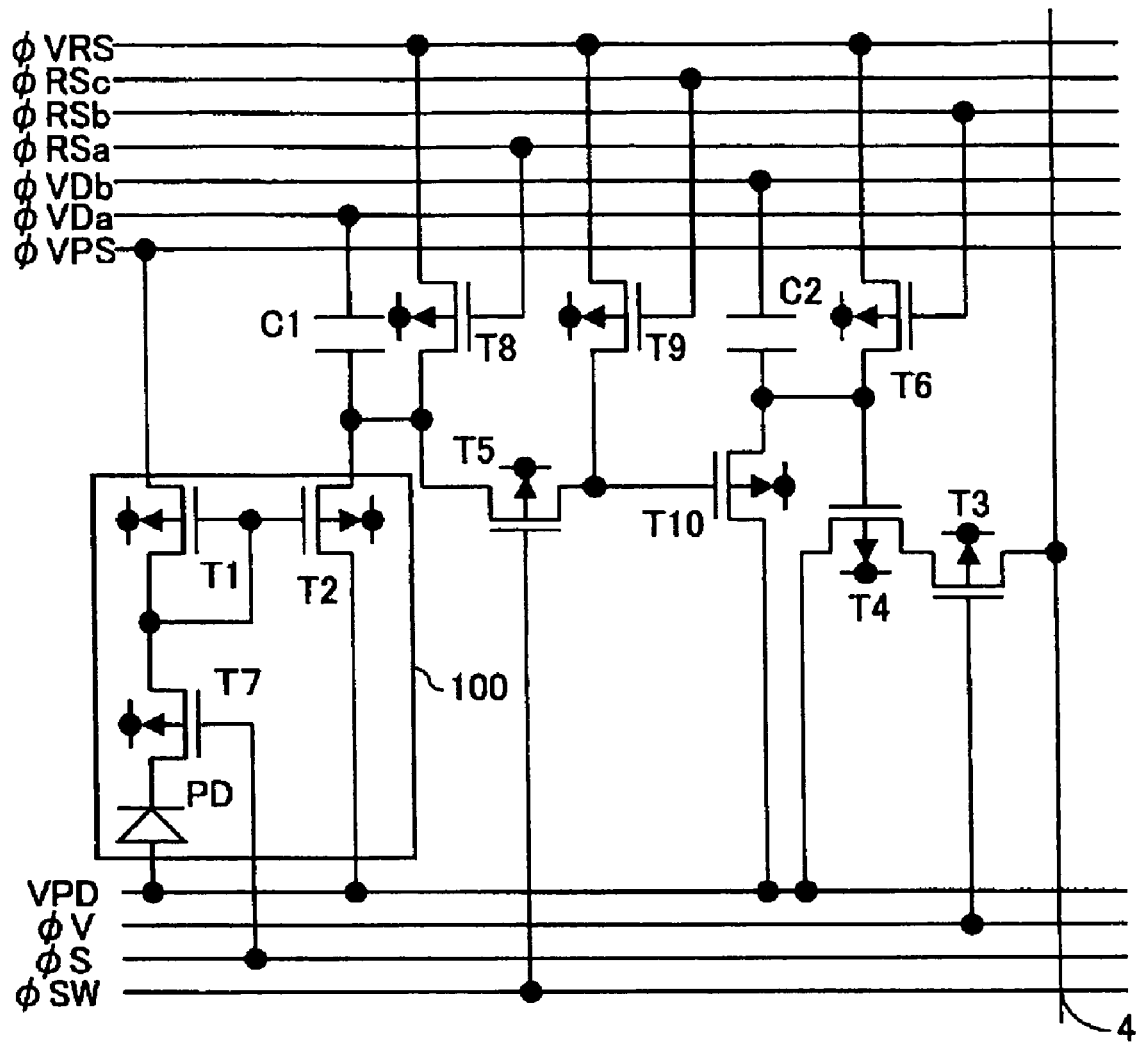
FIG. 8 is a circuit diagram that shows a structure of the pixel in the solid-state image sensing device according to a second embodiment.

The second embodiment which is applied to the pixels having the structure in FIG. 1 will be explained below with reference to the drawings. FIG. 8 is a circuit diagram that shows the structure of the pixel provided in the solid-state image sensing device used in the second embodiment. In the circuit diagram of FIG. 8, voltage signals φV and φVDb are supplied from the driver in the vertical scanning circuit 1, and voltage signals other than the voltage signals φV and φVDb are supplied from the driver 11.

The pixel shown in FIG. 8 is constituted so that the pixel structure shown in FIG. 3 applied to the first embodiment further has an MOS transistor T9 whose drain is connected with the source of the MOS transistor T5, and an MOS transistor T10 whose gate is connected with the source of the MOS transistor T5 and whose source is connected with the connecting node between the gate of the MOS transistor T4 and the capacitor C2. The MOS transistors T9 and T10 are p-channel MOS transistors similarly to the MOS transistors T1 to T8.

The DC voltage VPD is applied to the drain of the MOS transistor T11, and the signal φVRS is input into a source of the MOS transistor T9. The signal φRSc is input into a gate of the MOS transistor T9. The signals φVDa and VDb are given to the other ends of the capacitors C1 and C2, respectively.

The signals φVDa and VDb are binary voltage signals, and voltages for performing the integrating operation at the capacitors C1 and C2 are Vha and Vhb, respectively, and voltages for applying offset voltages in order to make the MOS transistors T10 and T4 effective in each operating range are Vla and Vlb, respectively.

1. First Example of the Operation of the Pixel

Figure 9:
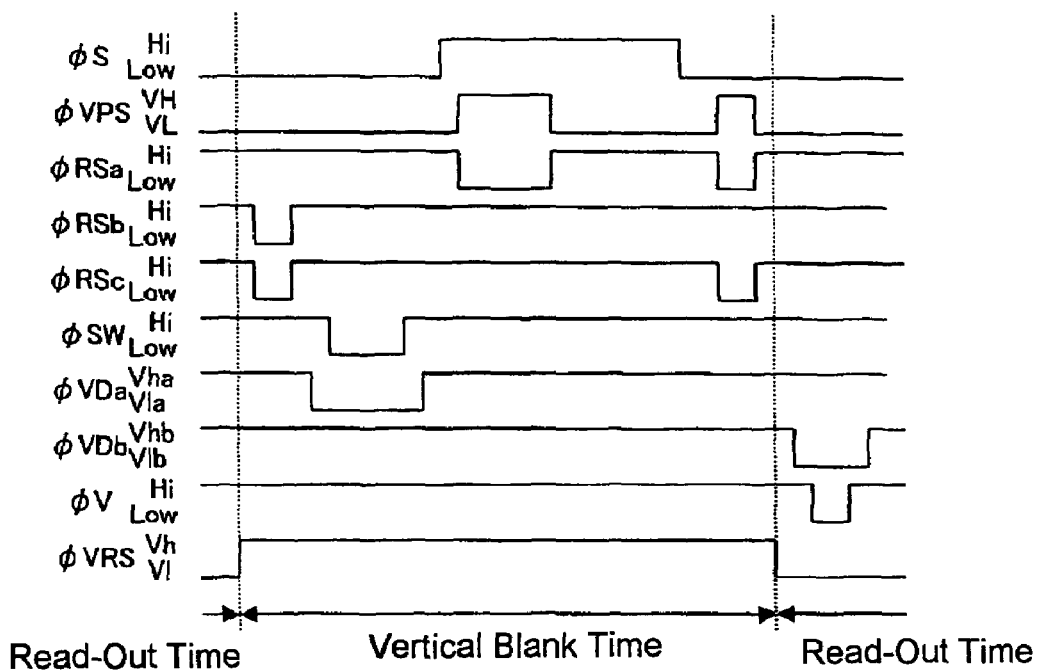
FIG. 9 is a timing chart that shows a first example of the operation of the pixel in FIG. 8.

The first example of the operation of the pixel having the structure in FIG. 8 will be explained below with reference to a timing chart of FIG. 9. In this operational example, the detailed explanation of the operation which is the same as that in the first example of the first embodiment in the timing chart of FIG. 4 is omitted. The signal φS is set to be low and the signal φVPS is set to VL, so that the photocharges according to the quantity of the incident light flow from the photodiode PD into the MOS transistor T1. At this time, the signals φVDa and φVDb are set to Vha and Vhb, so that the capacitors C1 and C2 are brought into an integration operable state. As a result, the integrating operation is performed at the capacitor C1. The signal φVRS is set to Vl, and a voltage difference between the source and the drain of the MOS transistors T6, T8 and T9 is lowered.

Thereafter, signals φRSb and φRSc are set to be low and the MOS transistors T6 and T9 are turned on, and the signal φVRS is set to Vh so that source voltages at the MOS transistors T6 and T9 are heightened. As a result, a voltage at a connecting node between the source of the MOS transistor T10 and the capacitor C2 and a gate voltage at the MOS transistor T10 are reset. When the signals φRSb and φRSc are set to be high, the signal φVDa is changed from Vha into Vla, and the low pulse signal φSW is given.

At this time, the signal φSW becomes low, so that the MOS transistor T5 is turned on, and the voltage which appears at the connecting node between the source of the MOS transistor T2 and the capacitor C1 is sampled and held by the gate of the MOS transistor T1. Therefore, since an electric current according to the voltage sampled and held at the gate flows into the source of the MOS transistor T10, negative charges flow into the capacitor C2 via the MOS transistor T10, so that the integrating operation is performed therein. When the signal φVDa is set to Vla and an offset voltage is applied, a voltage to be applied to the gate of the MOS transistor T10 can be effective in the operating range of the MOS transistor T10.

After the signal φSW is set to be high, and the signal φVDa is set to Vha. After the signal φSW is set to be high, the signal φS is set to be high, and the gate and the drain of the MOS transistor T1, and the gate of the MOS transistor T2 are started to be reset. At this time, the signal φVPS is temporarily set to VH, so that the negative charges accumulated at the gate of the MOS transistor T2 are recombined quickly. While the signal φVPS is VH, the signal φRSa is set to be low and the MOS transistor T8 is turned on, so that the a voltage at the connecting node between the capacitor C1 and the gate of the MOS transistor T2 is initialized.

The signal φVPS is set to VL and the potential at the MOS transistor T1 is initialized. The signal φRSa is set to be high, and the MOS transistor T8 is turned off. The signal φS is set to be low and the MOS transistor T7 is turned on, so that the MOS transistors T1 and T2 are electrically connected with the photodiode PD. After the signal φVPS is again set to be VH so that the negative charges remaining on the photodiode PD are recombined, the signal φVPS is set to VL. At this time, simultaneously the signals φRSa and φRSc are set to be low, so that the capacitor C1 and the gate of the MOS transistor T10 are initialized. The signal φVRS is set to Vl, and a voltage difference between the source and the drain of the MOS transistors T6, T8 and T9 is lowered.

The signals φS, φSW, φVPS, φRSa to RSc, φVDa and φVRS operate all the pixel G11 to Gmn composing the solid-state image sensing device simultaneously. The electric signals which are obtained by imaging at the same timing can be, therefore, accumulated at the capacitor C2 as the image signals. That is to say, a voltage, which is proportional to the integrated value of the quantity of the incident light in a linear or naturally logarithmic manner, appears at the connecting node between the capacitor C2 and the source of the MOS transistor T10.

After the signal φVDb is set to Vlb on each line, the low pulse signal φV is given, so that the MOS transistor T3 is turned on. An electric current, which is in accordance with the voltage based on the value obtained by integrating the quantity of the incident light at the capacitor C2, flows in the MOS transistor T4, so that the image signal which obtains a voltage value according to the integrated value of the quantity of the incident light appears at the signal line 4. When the signal φVDb is set to Vlb and an offset voltage is applied, the voltage to be applied to the gate of the MOS transistor T4 can be made to be effective in the operating range of the MOS transistor T4. After the signal φV is set to be high, the signal φVDb is set to Vhb.

After the operation is performed on each line and the image signals are output from all the pixels G11 to Gmn, the signals φS, φSW, φVPS, φRSa to RSc, φVDa and φVRS again operate all the pixels G11 to Gmn at the same timing. In this operational example, similarly to the first example in the first embodiment, the signal φVRS is Vh for the time which is approximately equal with the vertical blank time.

2. Second Example of the Operation of the Pixel

Figure 10:
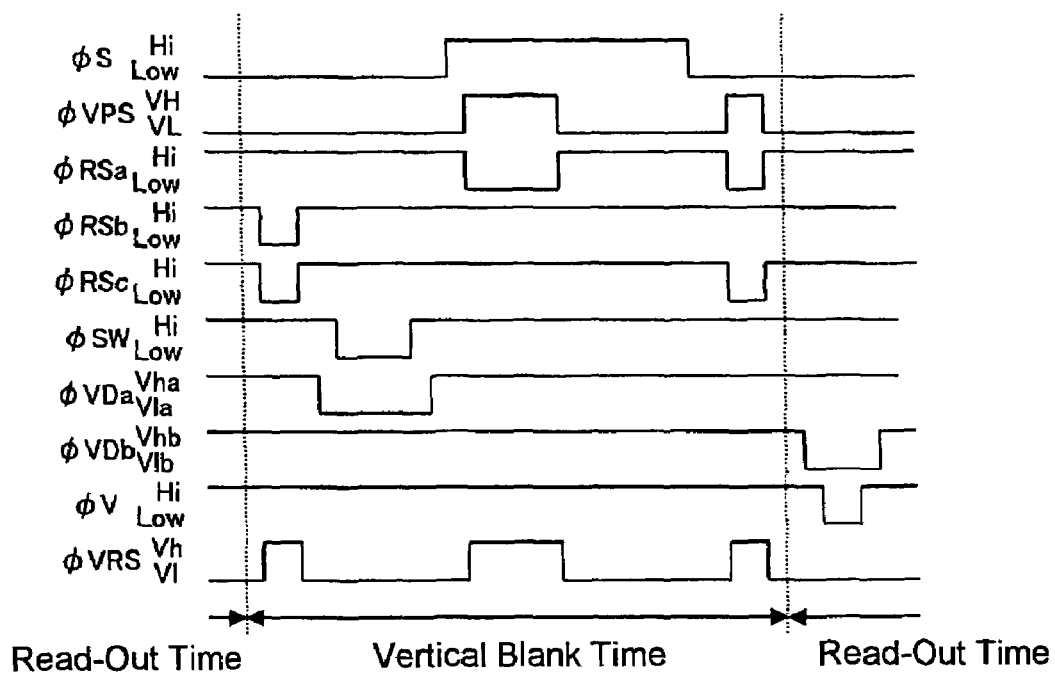
FIG. 10 is a timing chart that shows a second example of the operation of the pixel in FIG. 8.

The second example of the operation of the pixel with the structure in FIG. 8 will be explained below with reference to a timing chart of FIG. 10. A relationship between this example and the first example is approximately equal with the relationship between the second example and the first example of the operation of the pixel in the first embodiment. In the timing chart of FIG. 10, therefore, the detailed explanation of the operation which is the same as that in the timing charts of FIGS. 5 and 9 is omitted.

In the second example, the signals φS, φSW, φVPS, φRSa to RSc, φVDa and φVRb operate the pixels at the same timing as that in the first example of the second embodiment. Similarly to the second example of the first embodiment, when one of the signals φRSa to φRSc becomes low, the source voltages at the MOS transistors T6, T8 and T9 are heightened, and thus the signal φVRS is set to Vh. In the second example, only when the capacitors C1 and C2 and the gate of the MOS transistor T10 are rest, the signal φVRS is set to Vh. For this reason, the leak current can be reduced further than the first example even for the vertical blank time.

In the second embodiment, differently from the first embodiment, when the MOS transistor T5 is turned on, the voltage integrated by the capacitor C1 is amplified by the MOS transistor T10 and is again integrated by the capacitor C2. At this time, the electric charges accumulated at the capacitor C1 are divided as a capacity of the capacitor C1 and a gate capacity of the MOS transistor T10. Since the gate capacity is, however, very smaller than the capacity of the capacitor C1, lowering of sensitivity at the time of the sampling and holding at the MOS transistor T10 hardly occurs.

3. Another Structure of the Pixel

Figure 11:
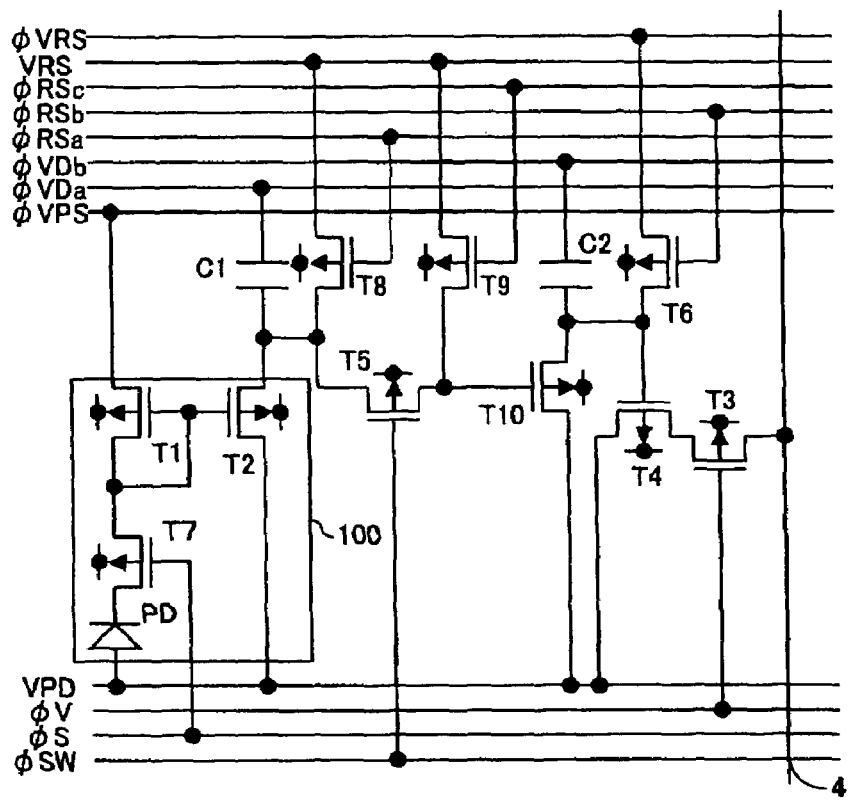
FIG. 11 is a circuit diagram that shows another structure of the pixel in the solid-state image sensing device according to the second embodiment.
Figure 12:
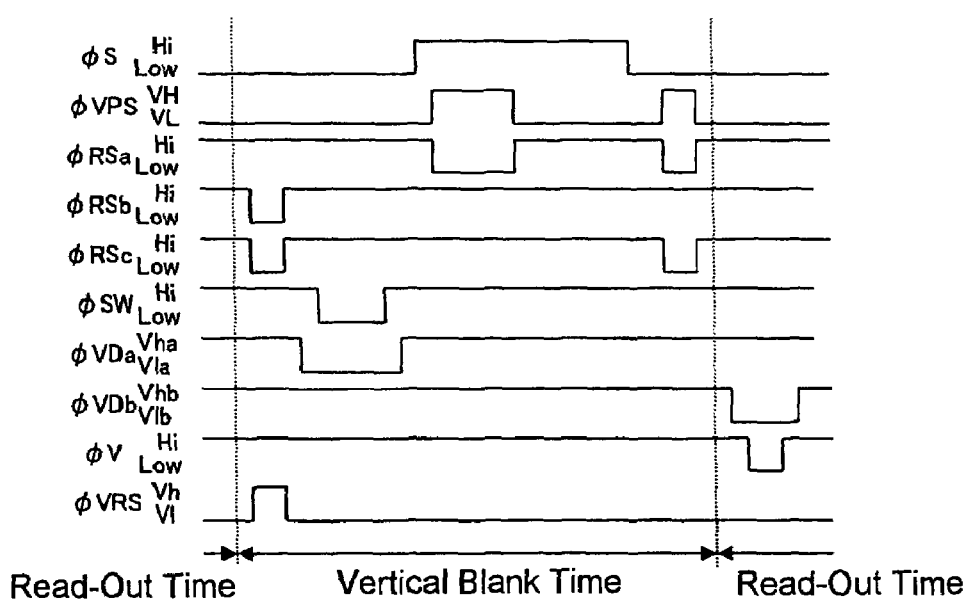
FIG. 12 is a timing chart that shows the operation of the pixel in FIG. 11.

The structure of the pixel in the second embodiment may be, as shown in FIG. 11, such that the DC voltage VRS is applied to the sources of the MOS transistors T8 and T9. Also in the circuit of FIG. 11, the voltage signals φV and φVDb are supplied from the driver in the vertical scanning circuit 1, and the voltage signals other than the voltage signal φV and φVDb are supplied from the driver 11. With such a structure, since the DC voltage VRS which always obtains the value Vh is applied to the sources of the MOS transistors T8 and T9, the capacitor C1 and the gate of the MOS transistor T10 can be reset regardless of the value of the signal φVRS. As shown in FIG. 12, therefore, only when the low pulse signal φRSb is given so as to reset the capacitor C2, the signal φVRS may be set to Vh.

Figure 13:
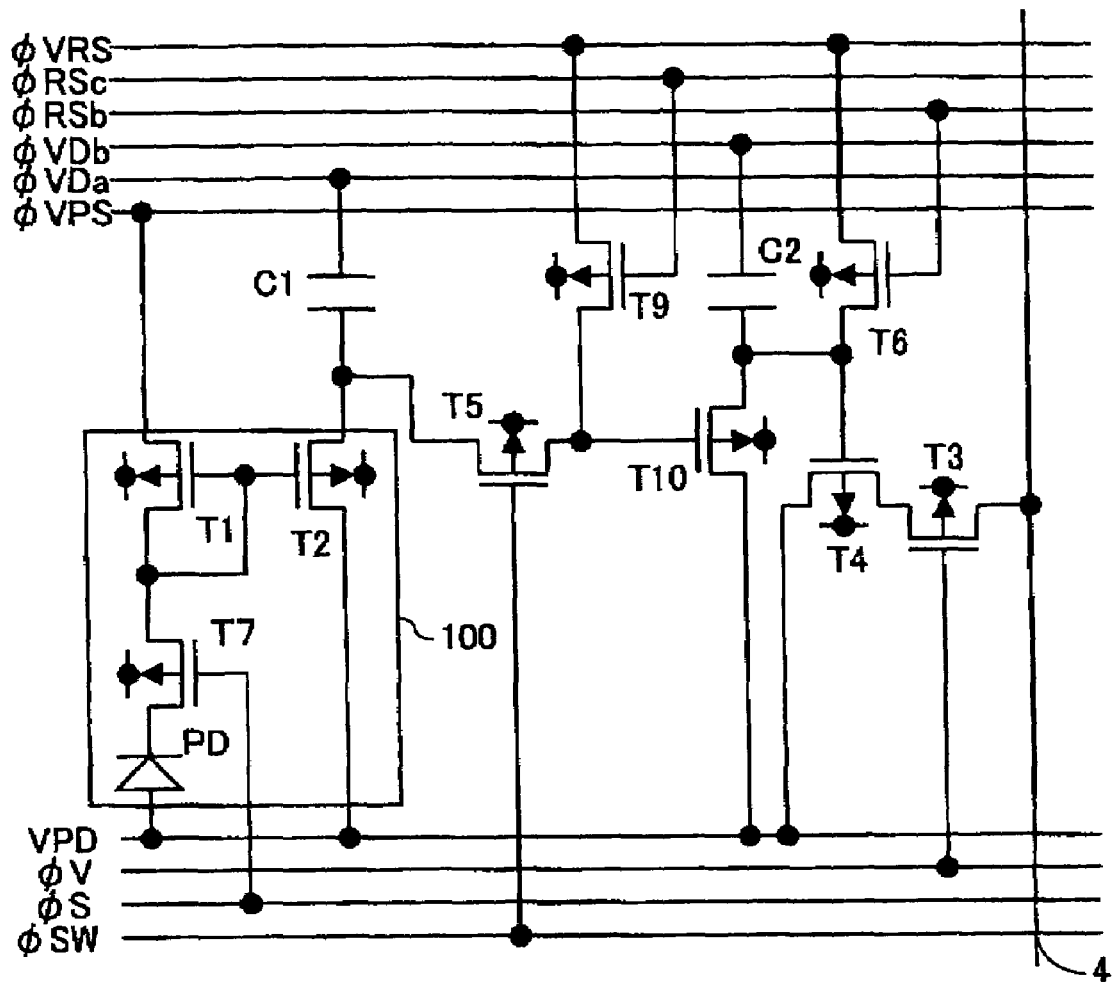
FIG. 13 is a circuit diagram that shows another structure of the pixel in the solid-state image sensing device according to the second embodiment.
Figure 14:
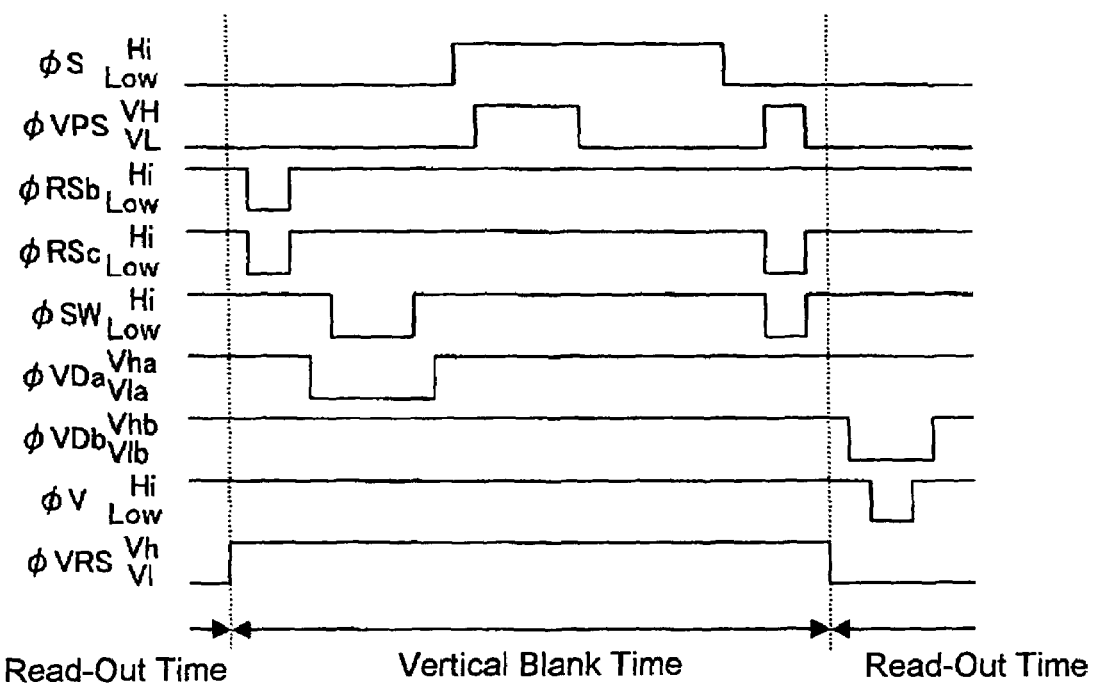
FIG. 14 is a timing chart that shows a first example of the operation of the pixel in FIG. 13.
Figure 15:
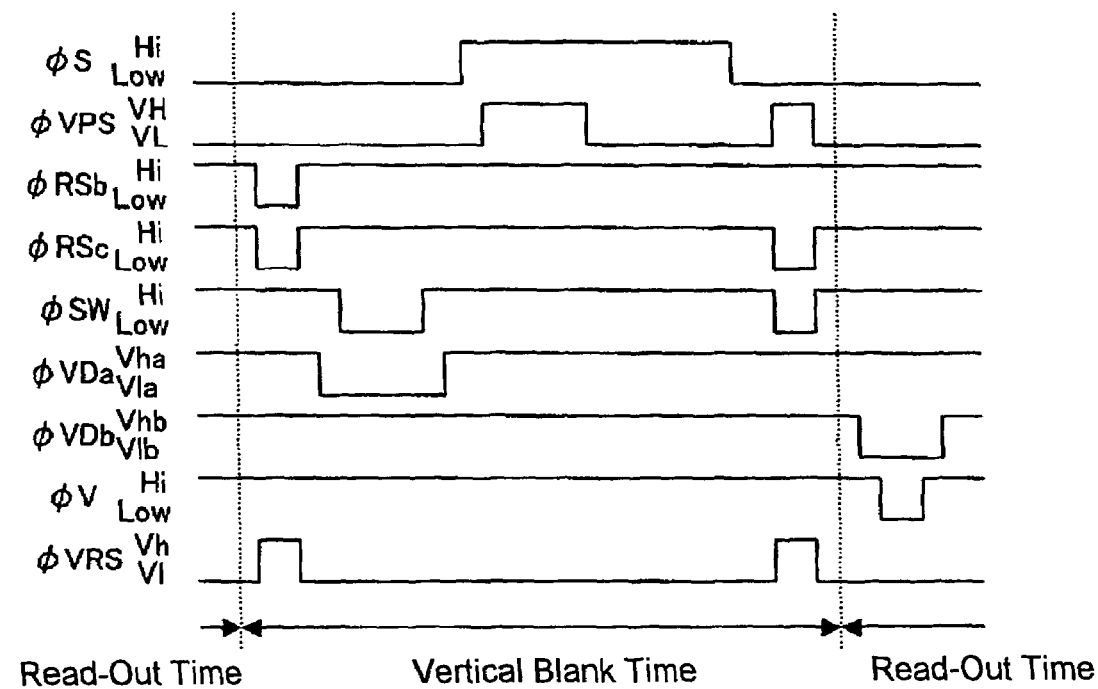
FIG. 15 is a timing chart that shows a second example of the operation of the pixel in FIG. 13.

In the second embodiment, the structure of each pixel may be, as shown in FIG. 13, such that the MOS transistor T8 is eliminated from the structure in FIG. 8. Also in the circuit of FIG. 13, the voltage signals φV and φVDb are supplied from the driver in the vertical scanning circuit 1, and the voltage signals other than the voltage signals φV and φVDb are supplied from the driver 11. At this time, like the first example of the operation of the pixel, in the case where the signal φVRS is set to Vh for the time corresponding to the vertical blank time, an operation according to a timing chart in FIG. 14 is performed. In the case where the signal φVRS is set to Vh for the time where the MOS transistors T6 and T9 are on, an operation according to a timing chart in FIG. 15 is performed.

At this time, differently from the pixel with the structure in FIG. 8, when the signal φVPS is set to VH and the signal φRSc is set to be low, the signal φSW is set to be low, so that the capacitor C1 and the gate of the MOS transistor T10 are reset. When the operation according to the timing chart in FIG. 14 is performed, the signal φVRS is set to Vh, the signals φRSb and φRSc are set to be low, the signals φRSc and φSW are set to be high and the signal φVRS is set to Vl. In the case where the operation according to the timing chart in FIG. 15 is performed, when at least one of the signals φRSb and φRSc is set to be low, the signal φVRS is set to Vh. At this time, similarly to the structure of FIG. 11, the DC voltage VRS may be applied to the source of the MOS transistor T9.

Figure 16:
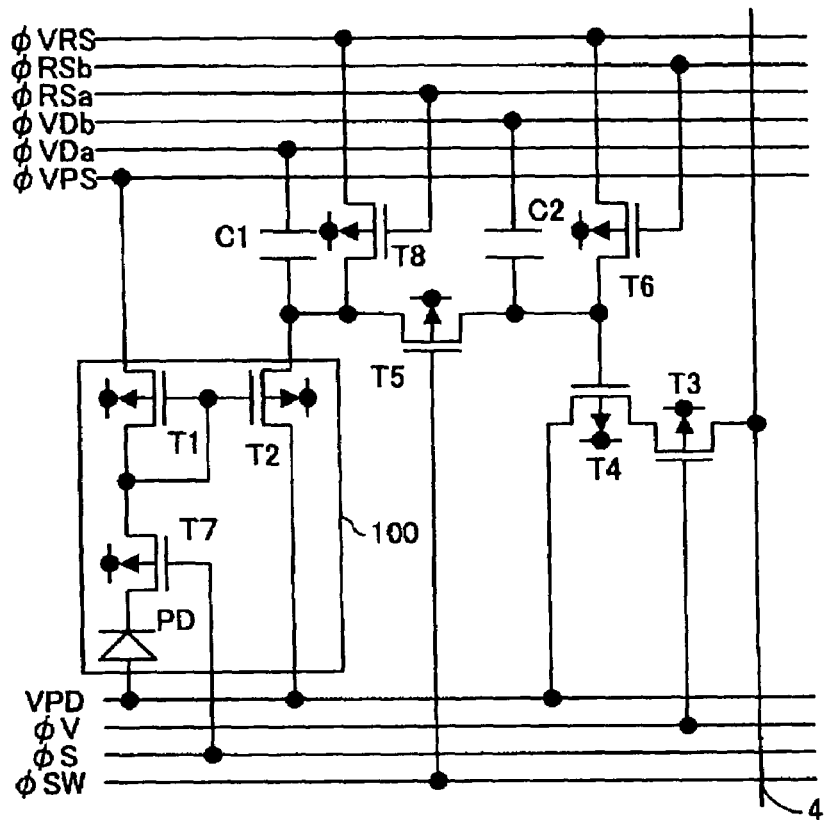
FIG. 16 is a circuit diagram that shows another structure of the pixel in the solid-state image sensing device of the present invention.

In the first embodiment, similarly to the second embodiment, as shown in FIG. 16, when the signals φVDa and VDb are given to the other ends of the capacitors C1 and C2 and the low pulse signal φSW is given, the signal φVDa may be set to Vla, and when the low pulse signal φV is given, the signal φVDb may be set to Vlb. Also in the circuit of FIG. 16, the voltage signals φV and φVDb are supplied from the driver in the vertical scanning circuit 1, and the voltage signals other than the voltage signals φV and φVDb are supplied from the driver 11.

Figure 17:
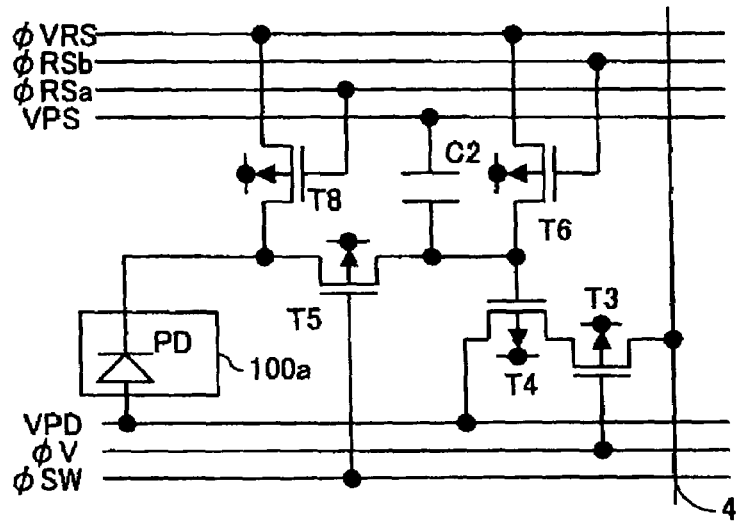
FIG. 17 is a circuit diagram that shows a structure of the pixel in the solid-state image sensing device of the present invention which performs a linear transforming operation.

In the first and second embodiments, the photoelectric conversion circuit 100 is composed of the MOS transistors T1, T2, T7 and the photodiode PD, but as shown in FIG. 17, may be composed of the photodiode PD whose anode is connected with the drain of the MOS transistor T5, and a photoelectric conversion circuit 100a which performs a linear transforming operation may be used. At this time, the drain of the MOS transistor T8 is connected with a connecting node between the anode of the photodiode PD and the drain of the MOS transistor T5, and the MOS transistor T8 operates so as to reset a voltage at a connecting node between the anode of the photodiode PD and the drain of the MOS transistor T5. The capacitor C1 is eliminated.

Figure 18:
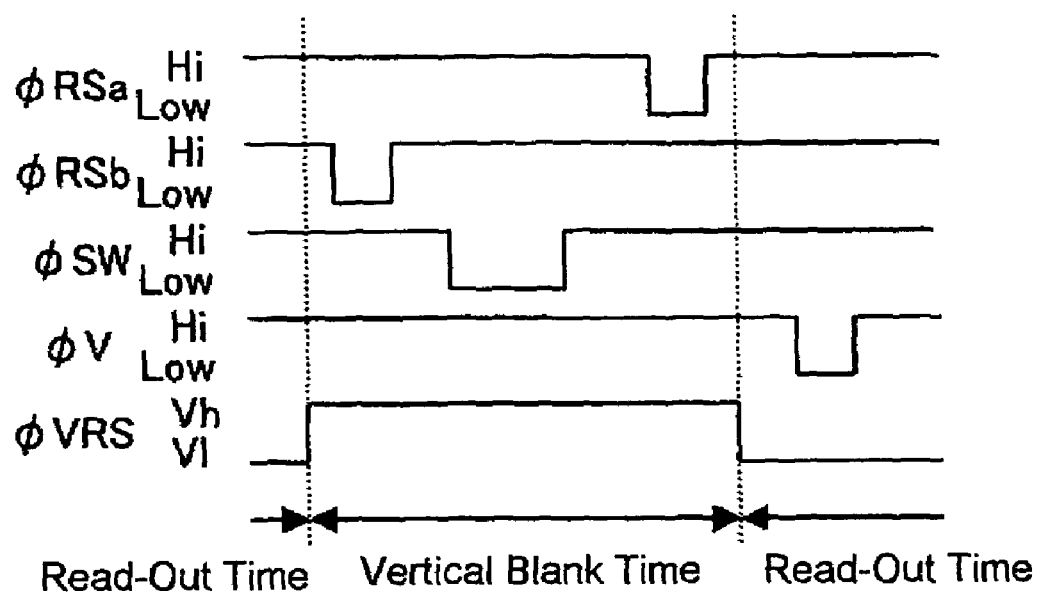
FIG. 18 is a timing chart that shows a first example of the operation of the pixel in FIG. 17.
Figure 19:
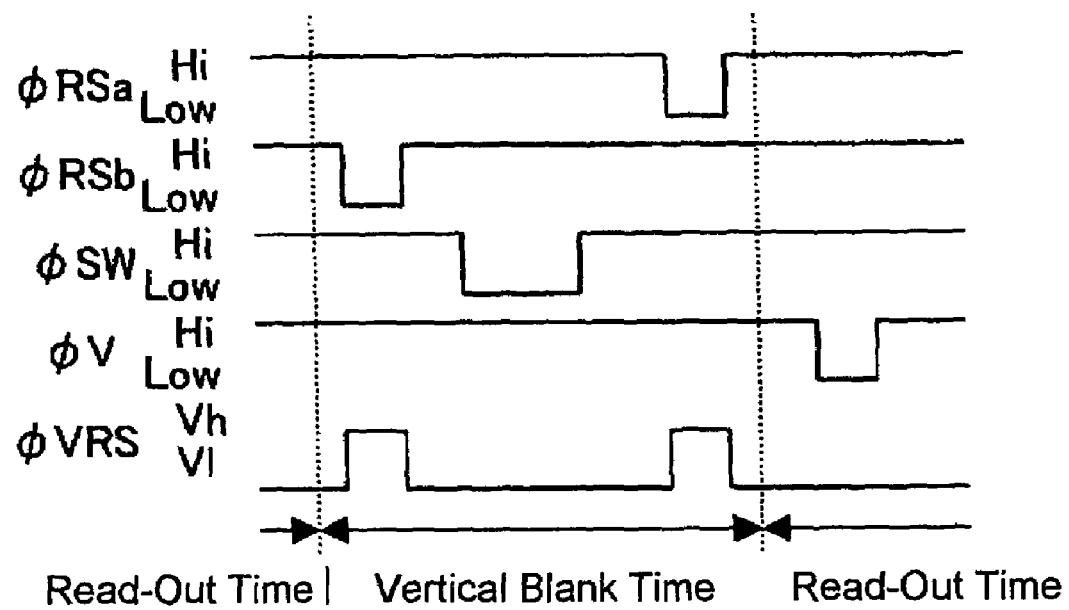
FIG. 19 is a timing chart that shows a second example of the operation of the pixel in FIG. 17.

At the time of the structure in FIG. 17, the operation of the pixel is performed according to a timing chart of FIG. 18 or 19. In the timing charts of FIGS. 18 and 19, the signals φSW, φRSa and φRSb perform the same operation. That is to say, after the low pulse signal φRSb is given and the capacitor C2 is reset, the low pulse signal φSW is given, and a voltage which appears at the anode of the photodiode PD is sampled and held by the capacitor C2. The low pulse signal φRSa is given so as to reset the anode of the photodiode PD, and the vertical blank time is ended. Thereafter, the low pulse signal φV is given to each line so that the output signals are output from the pixels on each line.

At this time, in the timing chart of FIG. 18, the signal φVRS becomes Vh and the signal φRSb becomes low, and the signal φRSa becomes high and the signal φVRS becomes Vl. As a result, the signal φVRS is Vh during the time which is approximately equal with the vertical blank time. In the timing chart of FIG. 19, while the signal φRSa and φRSb are low, the signal φVRS is Vh, so that the signal φVRS is Vh only during the reset operation of the MOS transistors T6 and T8. Also in the circuit of FIG. 18, the voltage signal φV is supplied from the driver in the vertical scanning circuit 1, and the voltage signals other than the voltage signal φV is supplied from the driver 11.

The structure of the photoelectric conversion circuit 100a which performs the linear transforming operation is not limited to the structure in FIG. 17 and may be another structure. Like the second embodiment, the photoelectric conversion circuit 100a may have the MOS transistor T10 or the capacitor C1. Like FIG. 6 or 11, the DC voltage VRS may be applied to the MOS transistor T8.

Figure 20:
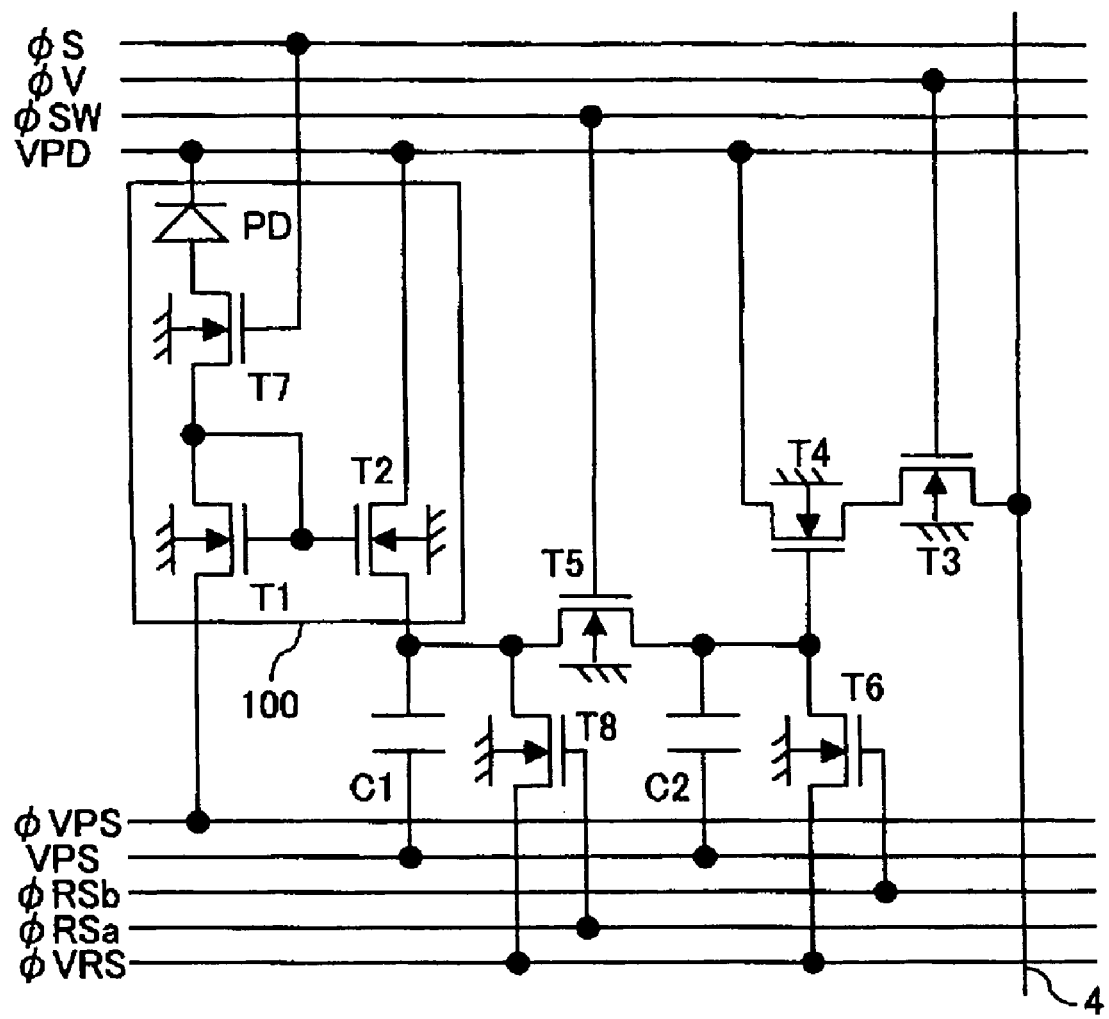
FIG. 20 is a circuit diagram that shows a structure of the pixel in the solid-state image sensing device of the present invention.
Figure 21:
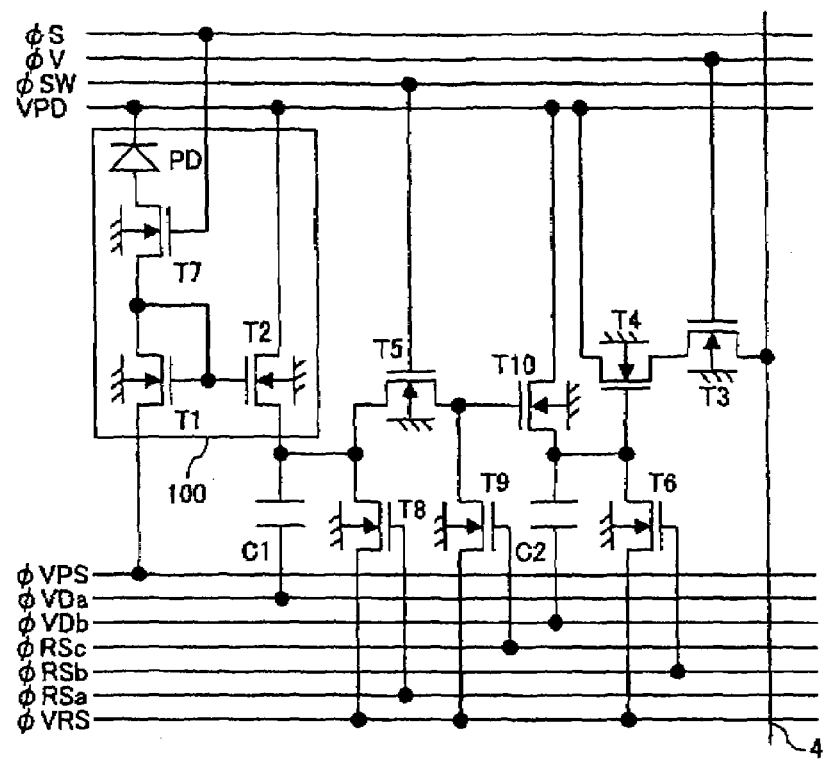
FIG. 21 is a circuit diagram that shows a structure of the pixel in the solid-state image sensing device of the present invention.
Figure 22:
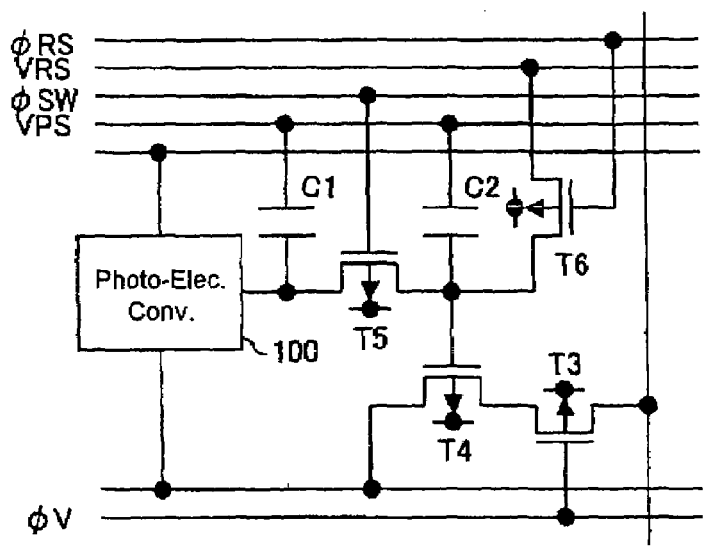
FIG. 22 is a circuit diagram that shows a structure of a pixel in a prior solid-state image sensing device.

In the first and second embodiments, the pixels are reset so that the linear transforming operation is switched into the logarithmic transforming operation at a predetermined brightness value, but the logarithmic transforming operation may be performed in the whole brightness range. The pixels are composed of the p-channel MOS transistors but may be composed of N-channel MOS transistors. At this time, in the structures of the pixels in the first and second embodiments, as shown in FIGS. 20 and 21, polarities of the pixels are reversed but the connecting relationships are the same.

According to the respective embodiments, the reset voltage is a binary or more voltage, a value of the reset voltage at the time of sampling and holding the electric signal at the sample hold circuit, and a value of the reset voltage at the time of resetting the sample hold circuit can be changed. The reset voltage at the time of sampling and holding the electric signal at the sample hold circuit is made to be different from the vale of the voltage at the time of resetting the sample hold circuit, so that the leak current from the sample hold circuit can be reduced. An influence due to the leak current which changes due to the ambient temperature, therefore, can be reduced, and an influence due to a change in the ambient temperature on the image signal can be reduced. When a plurality of pixels are provided, shading noise which occurs due to different output timing of the pixels can be reduced by suppressing the leak current.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A solid-state image sensing device having at least one pixel, said pixel comprising:
    a photoelectric conversion section for outputting an electric signal according to a quantity of incident light, said photoelectric conversion section including a photoelectric conversion circuit for generating an electric charge according to a quantity of incident light and an integrating circuit for outputting a voltage obtained by accumulating the electric charge from the photoelectric conversion circuit as the electric signal; and
    a sample hold circuit for sampling and holding the electric signal from the photoelectric conversion section and outputting the sampled and held electric signal as an image signal,
    wherein a reset voltage for resetting the sample hold circuit obtains at least two different values.

2. A solid-state image sensing device claimed in claim 1, wherein the at least one pixel has a switch for electrically connecting and disconnecting the photoelectric conversion section and the sample hold circuit.

3. A solid-state image sensing device claimed in claim 2, wherein a plurality of sets of the pixels are provided, and wherein the photoelectric conversion sections and the switches operate at a same timing with respect to the plurality of sets of pixels, and the electric signals obtained by the imaging at the same timing are sampled and held by the sample hold circuits on the pixels, respectively.

4. A solid-state image sensing device claimed in claim 3, wherein, after the sample hold circuits are reset, the switches are turned on, so that the electric signals from the photoelectric conversion sections are given to the sample hold circuits.

5. A solid-state image sensing device claimed in claim 1, wherein the integrating circuit comprises a capacitor for accumulating the electric charges output from the photoelectric conversion circuit.

6. A solid-state image sensing device claimed in claim 1, wherein the reset voltage to be applied to the sample hold circuit is also applied to the integrating circuit.

7. A solid-state image sensing device claimed in claim 1, wherein a DC reset voltage with a constant value which is different from the reset voltage to be given to the sample hold circuit is applied to the integrating circuit.

8. A solid-state image sensing device claimed in claim 1, wherein the sample hold circuit comprises a capacitor for sampling and holding the electric signal.

9. A solid-state image sensing device claimed in claim 8, wherein the sample hold circuit further includes a transistor having a first electrode, a second electrode to which the capacitor is connected, and a control electrode into which a voltage from the integrating circuit is inputted, and wherein a voltage which appears at a connecting node between the second electrode of the transistor and the capacitor serves as the image signal.

10. A solid-state image sensing device claimed in claim 8, wherein the sample hold circuit includes an output switch for electrically connecting and disconnecting an output signal line and the capacitor, the output line being for outputting the electric signal as the image signal.

11. A solid-state image sensing device claimed in claim 10, the photoelectric conversion section outputs an electric signal which is linearly converted with respect to the quantity of the incident light.

12. A solid-state image sensing device claimed in claim 10, the photoelectric conversion section outputs an electric signal which is converted logarithmically with respect to the quantity of the incident light.

13. A solid-state image sensing device claimed in claim 1,
wherein the at least one pixel has a switch for electrically connecting and disconnecting the photoelectric conversion section and the sample hold circuit,
wherein the integrating circuit comprises a first capacitor, while the sample hold circuit comprises a second capacitor and a transistor, and
wherein the solid-state image sensing device further comprises:
a first reset switch, connected with one end of the first capacitor for resetting the first capacitor;
a second reset switch connected with a control electrode of the transistor; and
a third reset switch, connected with one end of the second capacitor, for resetting the second capacitor.

14. A solid-state image sensing device claimed in claim 13, wherein the switch and the second reset switch are turned on, so that the first capacitor and the control electrode of the transistor may be reset simultaneously.

15. A solid-state image sensing device claimed in claim 1, wherein the at least one pixel comprises an output circuit for amplifying the voltage output from the sample hold circuit and outputting the image signal.

16. A solid-state image sensing device claimed in claim 1, wherein the at least one pixel outputs the electric signal which changes in a logarithmic manner with respect to the quantity of the incident light.

17. A solid-state image sensing device claimed in claim 1, wherein the photoelectric conversion circuit is switched between a linear transforming operation for outputting the electric signal which changes linearly with respect to the quantity of the incident light and a logarithmic transforming operation for outputting the electric signal which changes in the logarithmic manner with respect to the quantity of the incident light.

18. A solid-state image sensing device having at least one pixel, said pixel comprising:
a photoelectric conversion section for outputting an electric signal according to a quantity of incident light;
a sample hold circuit for sampling and holding the electric signal from the photoelectric conversion section and outputting the sampled and held electric signal as an image signal; and
an FET switch through which a reset voltage is applied to the sample hold circuit while the FET switch is turned on, said reset voltage for resetting the sample hold circuit including at least two different values including a first value and a second value,
wherein the first value is set so as to be suitable for resetting the sample hold circuit, while the second value is set so as to suppress a leakage of electric charge from the sample hold circuit through the FET switch.

19. A solid-state image sensing device claimed in claim 18, wherein a voltage difference between a source of the FET switch and a drain of the FET switch when the reset voltage having the second value is applied is smaller than that reset voltage having the first value is applied.

20. A solid-state image sensing device claimed in claim 19, wherein the FET switch comprises a P-channel MOS transistor, and wherein the second value is lower than the first value.

21. A solid-state image sensing device claimed in claim 19, wherein the FET switch comprises an N-channel MOS transistor, and wherein the second value is higher than the first value.

* * * * *

UNITED STATES PATENT AND TRADEMARK OFFICE
CERTIFICATE OF CORRECTION

PATENT NO. : 7,280,144 B2
APPLICATION NO. : 10/630984
DATED : October 9, 2007
INVENTOR(S) : Tomokazu Kakumoto and Masayuki Kusuda It is certified that error appears in the above-identified patent and that said Letters Patent is hereby corrected as shown below:

Cover Page:
Item (76) Inventors: delete "Tomokazu Kakumoto, c/o Minolta Co., Ltd., Osaka Kokusai Bldg., 3-13, 2-Chome, Azuchi-Machi, Chou-Ku, Osaka-Shi, Osaka 541-8556 (JP); Masayuki Kusuda, c/o Minolta Co., Ltd., Osaka Kokusai Bldg., 3-13, 2-Chome, Azuchi-Machi, Chou-Ku, Osaka-Shi, Osaka 541-8556 (JP)" and
insert -- Tomokazu Kakumoto, Nagaokakyo-shi (JP);". "Masayuki Kusuda, Nishinomiya-shi (JP) --.

Cover Page:
Item (73) Assignee: insert -- Minolta Co., Ltd., Osaka (JP) --.

Signed and Sealed this

Second Day of September, 2008

JON W. DUDAS
*Director of the United States Patent and Trademark Office*